United States Patent [19]

Feintuch

[11] Patent Number: 5,790,474
[45] Date of Patent: Aug. 4, 1998

[54] ACTIVE SONAR FOR UNDER-ICE CONDITIONS

[75] Inventor: Paul L. Feintuch, Covina, Calif.

[73] Assignee: Hughes Electronics, El Segundo, Calif.

[21] Appl. No.: 391,835

[22] Filed: Aug. 4, 1989

[51] Int. Cl.$^6$ ................................................. G01S 15/06
[52] U.S. Cl. ................................................. 367/92; 367/101
[58] Field of Search ................................ 367/92, 124, 90, 367/101, 99, 131

[56] References Cited

U.S. PATENT DOCUMENTS

| | | | |
|---|---|---|---|
| 3,267,416 | 8/1966 | Morse | 367/115 |
| 3,786,405 | 1/1974 | Chramiec et al. | 367/92 |
| 4,308,599 | 12/1981 | Thiele | 367/92 |
| 4,697,254 | 9/1987 | Pridham | 367/92 |

*Primary Examiner*—Ian J. Lobo
*Attorney, Agent, or Firm*—Leonard A. Alkov; William C. Schubert; Glenn H. Lenzen, Jr.

[57] ABSTRACT

Active sonar apparatus, especially adapted for detecting submarine targets under ice, includes means for providing first and second pulsed, underwater acoustic signals respectfully having a high frequency, $f_H$, and a low frequency, $f_L$. The high frequency, $f_H$, is selected for causing the signal to be reflected at the submerged, water-ice interface and and the low frequency, $f_L$, selected for enabling the signal to be propagated through the ice with no significant reflection at the water-ice interface while then causing the signal to be reflected at the above-water, air-ice interface. Included are means for separately receiving and processing the reflected signals from the first and second acoustic signals and for detecting possible target reflections (which may include ice reflections) as a function of range and angle cells. Further included are signal comparing means for comparing range and angle cells of the two reflected signals, a probable target detection being established when possible target detections for both reflected signals are indicated in corresponding cells. The high and low frequency signals may be separately generated or may be provided as interference signals by a parametric transponder.

12 Claims, 2 Drawing Sheets

ACTIVE SONAR FOR UNDER-ICE CONDITIONS

BACKGROUND OF THE INVENTION

1. Field of the Invention

The present invention relates generally to the field of active sonar and more particularly to active sonars configured for use in adverse underwater environments, expecially under ice fields.

2. Background Discussion

Since the development of sonar prior to the First World War, the range and target detection capabilities of sonars have been greatly increased. Many of the improvements to sonars have resulted from the extensive studying and the understanding of underwater acoustic phenomena associated with with oceans, including short term and long term ocean characteristics, which affect the propagation of acoustic signals. Such knowledge, together with the extensive use of sonar during the Second World War have enabled present active sonars to have power, range and sizes that are much greater than sonars of even a few decades ago. As a result, active sonars are presently operated at frequencies several octaves lower than those in the Second World War, sonar performance being correspondingly enhanced. Passive sonars have also trended towards use of lower frequencies to take fuller advantage of tonal or line components in the low frequency, submarine noise spectrum. Additional important sonar improvements in the area of data processing have more recently been made possible by the development of small, high capacity digital computers. This enhanced data processing capability enables improved target discrimination from background noise.

Parallel developments have correspondingly enabled vast improvements to be made in submarines, the usual targets for sonar detection. As a result of the development of nuclear powered drive systems and improved high strength alloys, present submarines can dive more deeply than their World War II counterparts, can range throughout the oceans of the world without refueling and can remain submerged almost indefinitely. Improvements have also been made to enable submarines to operate more quietly and the knowledge of underwater phenomena as relates to acoustic wave propagation has enabled submarines to take advantage of the ocean structure and characteristics to evade sonar detection. Improvements in sonar and in sumarines have thus gone hand-in-hand, each improvement in one field being an important driving force for improvements in the other field.

Typically submarine target detection by the use of sonar has proceeded on at least three fronts. Aircraft are used to seed suspected target areas with radio-transmitter "sonobouys". Surface ships using ship mounted sonars and/or towed sonar arrays are used extensively to track submarines. Anti-submarine or hunter submarines, using ship-board sonars and/or towed arrays are used to ferret out submarines.

Relatively recently, however, submarine detection has entered a new phase by diffculty resulting from the demonstrated capabilities of nuclear powered submarines to operate in regions under the polar ice fields. Under these extensive ice fields, submarines are virtually immune to detection from the ocean surface or from the air. Hidden among the highly irregular keel-like ice projections into the water, submarines are also very difficult to detect by hunter submarines or other specialized under water detection apparatus. Acoustic reverberation caused by acoustic reflections from the rough underside of the ice canopy and other underwater ice structure makes the discrimination of bonafide submarine targets from the ice structure extremely difficult, especially when the targets are at rest. Moreover, these ice-caused reverberations also tend to mask acoustic doppler effects associated with slowly moving targets. Still further complicating the under-ice sonar detection of submarine targets are the natural noises associated with the polar ice fields. These natural noises are, for example, caused by cracking of the ice under various thermal and wind conditions, by the grinding together of ice masses and by snow and wind storms above the ice.

Even further complicating the problem of sonar detection of submarine targets under polar ice fields is the upward bending of acoustic rays due to increasing sound speed with depth. This refracts sound upward causing reflections off the ice at good propagation regions, between which very poor propagation exists. This results in generally poor detection performance and erroneous sonar angle estimates.

Improved capability for detecting submarine targets hidden under polar ice fields is, therefore, extremely important for obvious military reasons. Accordingly, considerable efforts are understood to be currently directed towards improving sonar performance so as to enhance under-ice target detection and resolution capabilities. Because, however, such developmental efforts are ordinarily heavily classified, the precise nature or progress of these efforts is difficult to assess. It can, however, be safely presumed that various parallel or alternative development approches are being taken. So far as is known to the present inventor, and/or to the extent that developmental efforts in this field can be publically discussed, at least some improvements appear to be directed towards upgrading presently available, "open water" sonars. Inherent limitations are, however, considered by the present inventor to be associated with such sonar up-grading efforts and innovative approaches are considered essential if under-ice submarine detection problems are to be solved or substantially reduced in the foreseeable future.

Accordingly, as described below, the present invention involves a novel, dual frequency active sonar configured for substantially reducing, in an under-ice environment, the effects of ice-caused reverberations which mask target reflected acoustic waves.

SUMMARY OF THE INVENTION

Active sonar appartus, according to the present invention, and especially for the detection of submarine targets in an under-ice environment, comprises means for providing first and second, pulsed underwater acoustic signals at respective high and low frequencies, $f_H$ and $f_L$. The high frequency, $f_H$, is selected to cause substantial reflections of the first pulsed signal at the submerged, water-ice interface and the low frequency, $f_L$, is selected to enable the second pulsed signal to propagate through the ice without substantial reflection at the water-ice interface, but to cause the signal to be substantially reflected at the air-ice interface above the water, both such frequencies being also selected to cause the signals to be reflected by submarine targets of the type normally encountered.

Further comprising the sonar apparatus are means for separately receiving first and second reflected signals, corresponding respectively to the first and second acoustic signals, and means for processing the first and second reflected signals for target detection indications. Means are included for comparing the processed first and second reflected signals to determine whether or not any target

3 detection indications occur at common ranges for both processed signals, a probable target detection being indicated when both signals are reflected from an object at a common range.

The first and second acoustic signals, at respective frequencies, $f_H$, and, $f_L$, may be emitted by an acoustic transducer. Alternatively, a parametric acoustic transducer may be provided which emits first and second acoustic frequencies $f_a$ and $f_b$, so as to provide signals having frequencies $f_H$ and $f_L$ being thereby provided wherein the difference between the frequencies $f_a$ and $f_b$ is equal to $f_L$. Preferably $f_H$ is between about 20 KHz and 50 KHz and $f_L$ is between about 100 Hz and about 500 Hz.

BRIEF DESCRIPTION OF THE DRAWINGS

The present invention can more readily be understood by a consideration of the accompanying drawings in which.

DESCRIPTION OF THE PREFERRED EMBODIMENT

Figure 1:
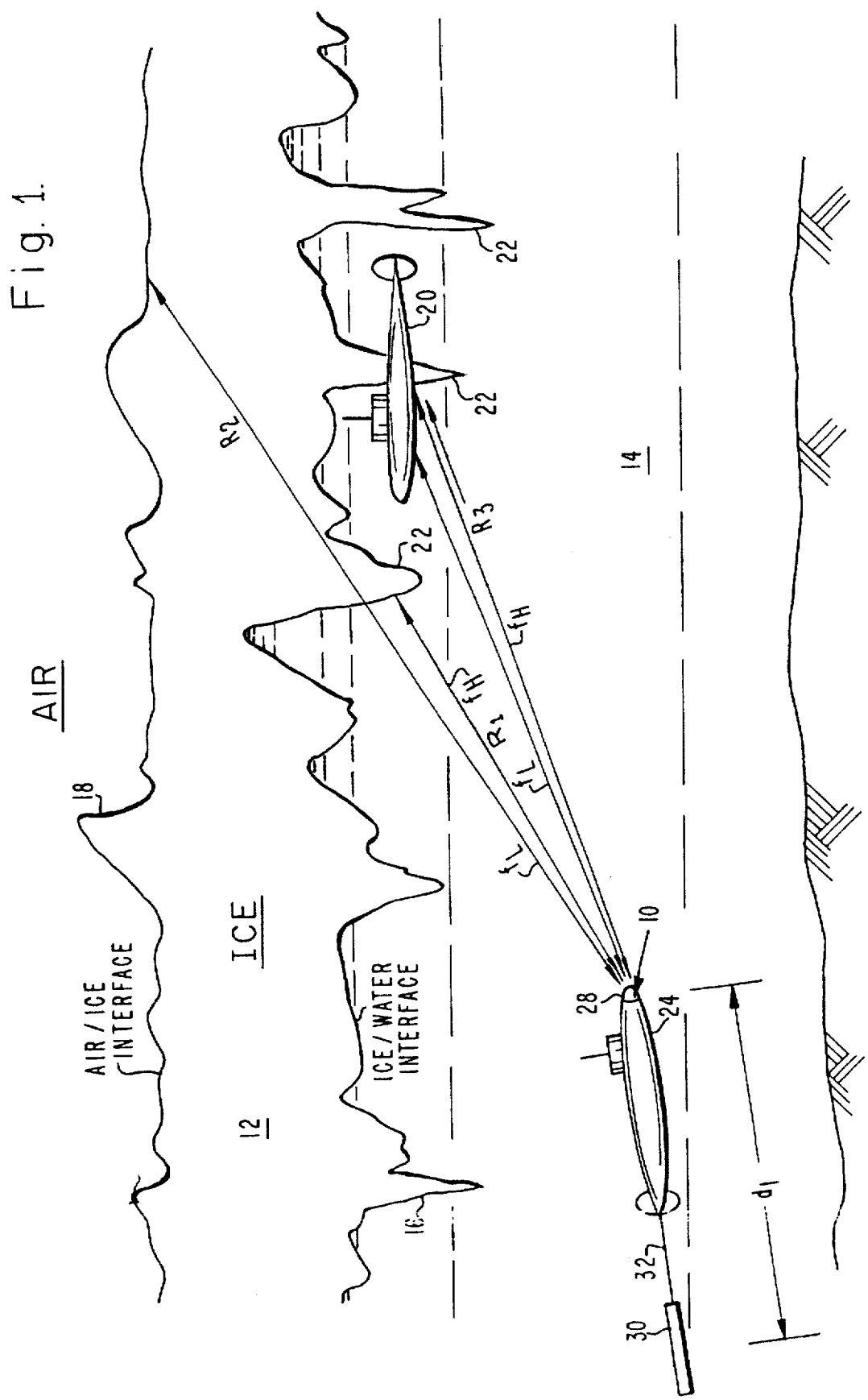
FIG. 1 is a pictorial drawing of a typical under-ice submarine scenario in which a hidden submarine is being hunted by an anti-submarine submarine utilizing a dual frequency, active sonar of the present invention.

FIG. 1 depicts a typical under-ice submarine scenario in which a dual frequency, active sonar apparatus 10 of the present invention is used for submarine target detection purposes. The under-ice, ocean environment depicted in FIG. 1 is defined, by way of example, by an extensive ice field or pack 12 which floats in a polar ocean region 14. Ice field 12 typically has a highly irregular underwater structure which defines a submerged, water-ice surface or interface 16. Similarly, ice field 12 typically has a highly irregular, above-water structure which defines an air-ice surface or interface 18.

There is depicted in FIG. 1 a target submarine 20 which is hidden below water-ice interface 16 among downwardly projecting ice masses which may be referred to as "ice keels" 22. Further depicted in FIG. 1 is an anti-submarine submarine or hunter submarine 24. Alternatively, a specially configured sonar torpedo (not shown) may be used as a submarine hunter in place of submarine 24.

Dual frequency sonar apparatus 10, according to the present invention, and as more particularly described below, is configured for emitting acoustic (sonar) signals at two different frequencies and for receiving and processing the reflected acoustic signals or reverberations associated with both emitted signals. The two different signal frequencies are particularly selected to enable target detection in the presence of substantial background acoustic reverberations from ice keels 22 and other, usually highly irregular, underwater ice structure of ice field 12.

Generally comprising dual frequency sonar apparatus 10 are dual frequency acoustic signal generating means 28, shown at the bow of hunter submarine 24. Acoustic generating means 28 may include or incorporate a high frequency signal hydrophone apparatus described below. Also included in sonar apparatus 10 may be a low frequency hydrophone array 30, of a conventional type, which is depicted in FIG. 1 as being towed, by a cable 32, from the stern of hunter submarine 24.

Figure 2:
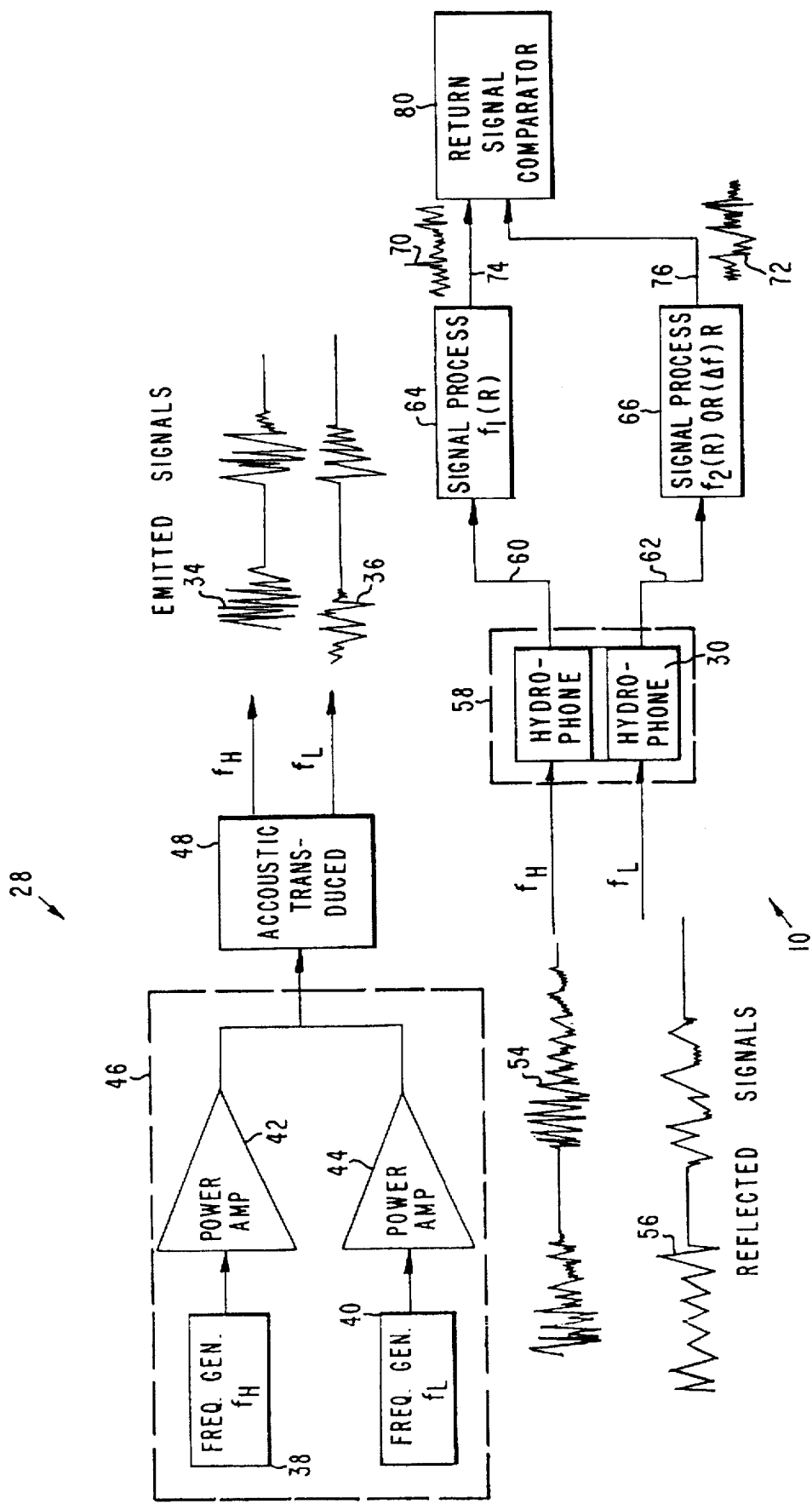
FIG. 2 is a functional block diagram of the dual frequency active sonar of the present invention, showing principal parts thereof.

As schematically shown in FIG. 2, acoustic wave generating means 28 emit respective first and second, pulsed sonar signals 34 and 36. First signal 34 is at a first, high frequency, $f_H$, and second signal 36 is at a second lower frequency, $f_L$, examples of such frequencies being given below. The frequency, $f_H$, of first signal 34 is particularly selected to cause the first signal to be entirely or almost entirely reflected at water-ice interface 16 associated with ice field 12. That is, the ice of ice field 12 is very highly reflective with respect to acoustic waves of frequency, $f_H$. In contrast, the low frequency, $f_L$ of second sonar signal 36 is particularly selected so that the ice of field 12 is virtually transparent to second sonar signal 36. As a result, second sonar signal 36, at frequency, $f_L$, passes through ice field 12, virtually unattenuated, but is reflected back towards wave generating means 28 by above-water, air-ice interface 18.

Both emitted signal frequencies, $f_H$ and $f_L$, are, of course, also selected so that target submarine 20 is highly reflective with respect to both first and second sonar signals 34 and 36. It should, therefore, be apparent that, except at target submarine 20, first sonar signal 34 will be reflected at water-ice interface 16 and second sonar signal 36 will be reflected at air-ice interface 18. Both signals 34 and 36 will, however, be reflected by target submarine 20.

By way of illustrative example, with no limitations being intended or implied, $f_H$ may advantageously be selected to be in the range of between about 20 KHz and about 50 KHz; low frequency, $f_L$, may be selected to be between about 100 Hz and about 500 Hz. Additional aspects of frequencies $f_H$ and $f_L$ will be disscussed below.

To enable providing separate, first and second pulsed sonar signals 34 and 36, at respective frequencies, $f_H$ and $f_L$, wave generating means 28 preferably comprises, as shown in FIG. 2, respective first and second frequency generators 38 and 40 which feed into corresponding power amplifiers 42 and 44. Frequency generators 38 and 40 and power amplifiers 42 and 44 may be of known, conventional types and collectively comprise what is identified in FIG. 2 as a signal generator 46. Coupled to receive the outputs of power amplifiers 42 and 44 is an acoustic transducer or projector 48 which may also be of a known, conventional type.

A not inconsequential problem associated with generating low frequency acoustic signals, such as the preferred 100 Hz signal of signal 36, is that a very large transducer 48 is required to provide a reasonably narrow acoustic "beam," as is considered advantageous in the present situation. Transducer 48 of the size required for a narrow beam, low frequency signal 36 will probably be too large for most hunter submarines and will almost certainly be too large for submarine hunter-types of torpedos.

In such size-limited cases, there is preferably used a parametric sonar which emits two different acoustic signals that are close to one another in frequency. When two such acoustic waves at nearly the same frequency are made to propagate in the same direction, the two waves interact due to non-linearities in the propagation to create two acoustic waves having frequencies substantially different from the emitted frequencies. The frequency of one of the created signals is equal to the sum of the two emitted frequencies, whereas the frequency of the other created signal is equal to the difference between the two emitted frequencies. For two emitted frequencies, $f_a$ and $f_b$, the two created frequencies ($f_1$ and $f_2$) are respectively equal to ($f_a + f_b$) and ($f_a - f_b$).

A low frequency signal is thus provided by a parametric transducer which emits two higher frequency signals, the frequency difference ($f_a - f_b$) between which is equal to the desired low frequency, $f_L$. It is possible to just use the upper transmitted frequency and the lower difference frequency, An alternative, is to select the emitted frequencies, $f_a$ and $f_b$, of a parametric transducer, so that $f_H=(f_a+f_b)$ and $f_L=(f_a-f_b)$ or $f_a \cong (f_H/2)$ and $f_b \cong (f_H/2-f_L)$. In either case, the lower frequency transmission will have the same highly directive narrow beam as the high frequency, even through the aperture is a small number of wavelengths at the lower frequency.

It is, however, to be appreciated that the acoustic frequencies $f_H$ and $f_L$, and the manner in which reflections thereof are processed, is the important consideration, and not the particular manner in which acoustic signals having these frequencies are generated.

As is further shown in FIG. 2, first and second reflected signals 54 and 56 (corresponding respectively to sonar signals 34 and 36), at respective frequencies of about $f_H$ and $f_L$, are received by hydrophone means 58, which may include towed hydrophone array 30 (FIG. 1). From the preceeding description, it will be evident that first reflected signal 54 comprises, in the absence of a target 20, reflections from water-ice interface 16 and second reflected signal 56 comprises reflections from air-ice interface 18.

Received reflected signals 54 and 56 are conducted over respective electrical lines 60 and 62 for signal processing in respective first and second signal processors 64 and 66. Such signal processing may be in a conventional manner, by range and angle cell integration or digital thresholding, which identifies possible targets (which may include ice keels) while eliminating most "false alarms." Resulting processed signals 70 and 72 are respectively provided, by processors 64 and 66, over electrical lines 74 and 76 to return signal comparator 80 (FIG. 2).

Within signal comparator 80, signals 70 and 72 are compared or correlated, by known signal comparison techniques, at preselected range (time) intervals to examine for target detection indicators occurring in the same range cell or cells interval for both signals 70 and 72, thereby indicating a true target detection.

As above described, first signal 34 is provided at a high frequency $f_H$, which causes the signal to be reflected at water-ice interface 16 which may, as an example, be at a variable range, $R_1$ from hunter submarine 24. Second signal 36 is provided at low frequency, $f_L$, which enables the signal to penetrate field 12 and be reflected at air-ice interface 18, at a variable range $R_2$. Processed return signal 70, which corresponds to emitted signal 34, will therefore exhibit a series of detections from interface 16 at ranges covered by $R_1$. Processed return signal 72, corresponding to emitted signal 36, will exhibit detection signals at ranges covered by the range $R_2$. Provided that signals 34 and 36 are emitted in the same, relatively narrow beam directions, the ranges $R_1$ and $R_2$, will ordinarily not be the same. Therefore, correlation between first and second reflected signal detections will not exist unless both such signals are reflected by a common object, such as target 22, at a common range, $R_3$.

Accordingly, when both processed return signals 70 and 72 exhibit a detection or detections at the same range, there exists a high probability that an underwater target, which reflects both signals 34 and 36, has been located. In determining such range correlation, any necessary distance offset, for example, an offset distance, d, between high and low frequency hydrophones (FIG. 1), is factored into processors 64 and 66 and comparator 80.

Signal comparator 80 may be implemented in various ways known to those skilled in the sonar and signal processing arts. Processed signals 70 and 72 may, for example, be digitized and range correlations made by a suitably programmed computer or microprocessor. As another example, the range correlation between processed signals 70 and 72 may be accomplished visually by displaying the reflected signals on a dual trace CRT.

Each signal "channel" as above discussed, operates independently of the other upstream of signal comparator 80. Accordingly, either one of the high frequency, $f_H$, or low frequency, $f_L$, signal channels can be used independently in "open water" for the detection of submarines. There is thus no need for separate open water and under-ice sonars.

Although there has been described above a specific arrangement of a dual frequency sonar for purposes of illustrating the manner in which the invention can be used to advantage, especially for detecting under-ice submarine targets, it is to be appreciated that the invention is not limited thereto. Accordingly, any and all modifications and variations which may occur to those skilled in the art are to be considered to be within the scope and spirit of the invention as defined in the appended claims.

What is claimed is:

1. Active sonar apparatus for detecting submarine targets in an under-ice, ocean environment, the sonar apparatus comprising:

a) means for providing a first underwater acoustic signal having a high frequency, $f_H$, and for providing a second underwater acoustic signal having a low frequency, $f_L$, the high frequency, $f_H$, being in a frequency range to cause substantial reflection of the first signal at a submerged, water-ice interface and the low frequency, $f_L$, being in a frequency range to enable the second signal to propagate through ice without substantial reflection at the water-ice interface and to cause the reflection thereof at an air-ice interface above the water; both the high and low frequencies, $f_H$ and $f_L$, being further selected to be reflected by a submarine target of types expected to be encountered;

b) means for separately receiving first and second reflected signals corresponding respectively to said first and second acoustic signals; and c) means for processing said first and second received signals for detecting the presence and range of possible targets; and, d) means for comparing the processed first and second received signals for detecting said possible targets having a common range, the presence of processed first and second received signals having a common range corresponding to a submarine target at the common range.

2. The sonar apparatus as claimed in claim 1, including acoustic transducer means for emitting the first acoustic signal at the high frequency, $f_H$, and the second acoustic signal at the low frequency, $f_L$.

3. The sonar apparatus as claimed in claim 1, including parametric acoustic transducer means for emitting one signal of a frequency, $f_a$, and second signal at a frequency, $f_b$, and wherein $f_a \cong f_H/2$ and $f_b \cong (f_H/2-f_L)$.

4. The sonar apparatus as claimed in claim 1 wherein the high frequency, $f_H$, is between about 20 KHz and about 50 KHz.

5. The sonar apparatus as claimed in claim 1 wherein the low frequency, $f_L$, is about 100 Hz.

6. Active sonar apparatus for the detection of submarine targets in an under-ice, ocean environment, the sonar apparatus comprising:

a) an underwater acoustic transducer;

b) means for causing the transducer to emit a first, pulsed, acoustic signal having a high frequency, $f_H$, and a second, pulsed, acoustic signal having a low frequency, $f_L$, the high frequency, $f_H$, being selected from a range of frequencies substantially reflected at a submerged water-ice interface and the low frequency, $f_L$, being selected from a range of frequencies propagated through ice without substantial reflection at the water-ice interface and reflected at an above water, air-ice interface, the frequencies $f_H$ and $f_L$ being further selected from a range of frequencies reflected by a submarine target;

c) means for separately receiving reflections of the first and second acoustic signals;

d) means for separately processing the received reflections of the first and second acoustic signals for detecting the range of possible target reflections; and e) means for comparing the ranges at which the possible target reflections occur and generating a probable target detection signal in response to possible target reflections have coincident range.

7. The active sonar apparatus as claimed in claim 6 wherein the frequency, $f_H$, is between about 20 KHz and about 50 KHz and the low frequency, $f_L$, is between about 100 Hz and about 500 Hz.

8. The active sonar apparatus as claimed in claim 6 wherein the means for receiving the reflected signals include a towed hydrophone array configured for receiving reflections of the emitted signal having the low frequency, $f_L$.

9. An active sonar apparatus for the detection of submarine targets in an under-ice, ocean environment, said sonar apparatus comprising:

a) a parametric transducer;

b) means for causing the parametric transducer to emit a first pulsed acoustic signal having a frequency, $f_a$, and a second pulsed acoustic signal having a frequency, $f_b$, to provide first and second interference signals at respective frequencies $f_H$ and $f_L$ the difference between the frequencies $f_a$ and $f_b$ being equal to $f_L$; the frequency, $f_H$, being selected to cause the first interference signal to be substantially reflected at a submerged, water-ice interface and the frequency, $f_L$, being selected to enable the second interference signal to be transmitted through ice and to cause the second interference signal to be substantially reflected at the air-ice interface above the water;

c) means for separately receiving reflections of the first and second interference signals;

d) means for processing the received reflections of the first and second interference signals to determine the ranges of said possible target reflections; and e) means for comparing the processed reflections of the first and second interference signals and determining common ranges thereof at which possible target reflections occur so as to thereby identify probable target ranges.

10. A method for detecting submarine targets in an under-ice, environment comprising:

a) propagating a first pulsed acoustic signal in a direction to be examined for said submarine targets, said first pulsed acoustic signal having a frequency such that the first pulsed signal propagates through water but is reflected by a water/ice interface and also is reflected by a submarine target;

b) propagating a second pulsed acoustic signal in the direction to be examined for said submarine targets, said second pulsed acoustic signal having a frequency such that the second pulsed signal propagates through water and also through the water/ice interface, but is reflected by a submarine target;

c) receiving acoustic reflected signals resulting from said first pulsed acoustic signal;

d) receiving second acoustic reflected signals resulting from said second pulsed acoustic signal;

e) processing said first and second acoustic reflected signals to determine the range at which said first and second acoustic reflected signals were reflected; and f) comparing the range at which the first acoustic reflected signal was reflected with the range at which the second acoustic reflected signal was reflected, wherein a probable submarine target is indicated when said first and second acoustic reflected signals have a common range.

11. The method of claim 10 wherein said steps of propagating a first pulsed acoustic signal and propagating a second pulsed acoustic signal comprise propagating said first and second pulsed acoustic signals in narrow beams.

12. The method of claim 11 wherein said steps of propagating a first pulsed acoustic signal and propagating a second pulsed acoustic signal comprise propagating said first and second pulsed acoustic signals in narrow beams at approximately the same time.

* * * * *